US007155517B1

(12) United States Patent
Koponen et al.

(10) Patent No.: US 7,155,517 B1
(45) Date of Patent: Dec. 26, 2006

(54) SYSTEM AND METHOD FOR COMMUNICATING REFERENCE INFORMATION VIA A WIRELESS TERMINAL

(75) Inventors: Pekka Koponen, Espoo (FI); Seija Salmela, Masala (FI)

(73) Assignee: Nokia Corporation, Espoo (FI)

( * ) Notice: Subject to any disclaimer, the term of this patent is extended or adjusted under 35 U.S.C. 154(b) by 563 days.

(21) Appl. No.: 09/672,401

(22) Filed: Sep. 28, 2000

(51) Int. Cl.
 *G06F 13/00* (2006.01)
(52) U.S. Cl. .................. 709/227; 709/219; 707/10
(58) Field of Classification Search ........ 709/217–219, 709/227; 707/1, 10, 2; 704/1–10
 See application file for complete search history.

(56) References Cited

U.S. PATENT DOCUMENTS

| | | | |
|---|---|---|---|
| 4,980,829 A | 12/1990 | Okajima et al. ............... 704/5 |
| 5,404,299 A | 4/1995 | Tsurubayashi et al. ........ 704/10 |
| 5,497,319 A | 3/1996 | Chong et al. .................. 704/2 |
| 5,526,259 A | 6/1996 | Kaji ............................. 704/3 |
| 5,675,815 A | 10/1997 | Yamauchi et al. .......... 715/530 |
| 5,867,811 A | 2/1999 | O'Donoghue ................... 704/1 |
| 5,966,685 A | 10/1999 | Flanagan et al. ............... 704/8 |
| 6,085,162 A | 7/2000 | Cherny ....................... 704/277 |
| 6,112,206 A | 8/2000 | Morris et al. ................ 707/10 |
| 6,167,450 A * | 12/2000 | Angwin et al. ............. 709/227 |
| 6,321,257 B1 | 11/2001 | Kotola et al. |
| 6,339,795 B1 * | 1/2002 | Narurkar et al. ............ 709/246 |
| 6,522,889 B1 | 2/2003 | Aarnio |
| 6,539,384 B1 * | 3/2003 | Zellner et al. ................ 707/10 |
| 6,594,484 B1 * | 7/2003 | Hitchings, Jr. ............ 455/414.1 |
| 6,647,409 B1 * | 11/2003 | Sherman et al. ............ 709/203 |
| 6,675,202 B1 * | 1/2004 | Perttunen .................... 709/217 |
| 6,985,454 B1 * | 1/2006 | Wiedeman et al. ......... 370/316 |

FOREIGN PATENT DOCUMENTS

| | | |
|---|---|---|
| EP | 0 982 672 A2 | 3/2000 |
| EP | 0 993 165 A2 | 4/2000 |
| EP | 0 994 608 A2 | 4/2000 |
| WO | WO 99/61984 | 12/1999 |

OTHER PUBLICATIONS

May 2000, Neal Leavitt, *Will WAP Deliver the Wireless Internet?* pp. 16-20.

* cited by examiner

*Primary Examiner*—Kenneth R. Coulter
(74) *Attorney, Agent, or Firm*—Hollingsworth & Funk, LLC

(57) ABSTRACT

A system and method for providing reference information to a user of a wireless terminal operating within a wireless network. Request identifiers are entered at the wireless terminal to identify desired reference information corresponding to the request. The desired reference information is presented to the user via the wireless terminal if the desired reference information is locally stored at the wireless terminal. If the desired reference information is not locally stored, the request identifier is transmitted from the wireless terminal to a data server, such as a dictionary server, operating within a second network via a gateway bridging the networks, and is presented on the wireless terminal.

39 Claims, 9 Drawing Sheets

SYSTEM AND METHOD FOR COMMUNICATING REFERENCE INFORMATION VIA A WIRELESS TERMINAL

FIELD OF THE INVENTION

The present invention relates generally to information services in wireless networks, and more particularly, to a system, method and apparatus for obtaining reference information via a wireless terminal across multiple network platforms.

BACKGROUND OF THE INVENTION

Computer networking broadly refers to the data communication system resulting from linking two or more computing systems. Networking allows those who can access the network to share programs, data, network resources, database information, and to facilitate other functions such as e-mail and data backups. The need for immediate access to information has fueled the pursuit of more sophisticated networks and network applications to conveniently and efficiently communicate information.

Due to its vast reach, the global web of interconnected computers and computer networks referred to as the Internet has proved to be an invaluable tool in satisfying the need for on-demand information. The Internet is used as a business and personal tool to facilitate global e-mail, remote data access, research, etc. Its ability to deliver multimedia content has also established the Internet as an entertainment tool for playing games, delivering stream content such as video, audio and MP3, and the like.

Gaining access to the information available on the Internet conventionally required a hardware connection to the Internet. While the Internet allows users to access information via any computer or terminal connected to the Internet, the need for a hardware connection established an undesirable physical limitation to Internet information access—a particular impediment to users that spend a substantial amount of time on the move. As users become more dependent on information and services provided via the Internet, an integration of the Internet and the wireless domain becomes increasingly important.

Wireless networks, such as GSM, IS-136, IS-95, PDC, etc., have traditionally been used in connection with mobile telephone communication. These sophisticated wireless networks made possible another aspect of communication convenience, by allowing mobile telephone users to communicate with other mobile users and with landline telephony systems. However, the need still existed to integrate information networks, such as intranets and the Internet, with the portability and convenience of mobile devices.

This need gave rise to efforts to integrate the Internet and other networks with wireless network platforms. One solution is the Wireless Application Protocol (WAP) which brings the convenience of the Internet into the wireless community. WAP bridges the gap between the wireline Internet paradigm and the wireless domain, to allow wireless device users to enjoy the benefits of the Internet across both platforms.

Generally, WAP is a set of protocols that accounts for characteristics and functionality of both Internet standards and standards for wireless services. It is independent of wireless network standards, and is designed as an open standard. The motivations for WAP are primarily a result of physical and logical limitations of small wireless devices, such as limited keyboards and displays, limited bandwidth, limited memory and processing capabilities, and limited battery power. A markup language, referred to as the wireless markup language (WML), is used for authoring services designed to fit these smaller, and often portable, handheld devices that have a considerably limited display area as compared to their desktop counterparts targeted by HTML. Another feature of WAP services is the availability of supporting more advanced functional tasks using WMLScript, which is at least loosely analogous to utilizing JavaScript in connection with HTML (HyperText Markup Language). The functional enhancements available through WMLScript include procedural logic and computational functions to WAP-based services.

WAP therefore allows desired information stored on a remote network to be delivered to the wireless device within the wireless network. However, it is not always desirable to necessitate access to the remote network for desired information, as it may be more time consuming, and may be associated with a transaction or access fee to obtain desired information. It is also undesirable for all information to be stored locally, as wireless or other mobile devices are generally limited in memory capacity. Mobile devices also often operate using preset navigation structures, which makes navigation parameters difficult to change. These and other limitations make navigation and content delivery to WAP devices problematic.

In view of various inherent limitations of mobile devices, and the need to provide access to the wealth of reference information available on existing network platforms, it would be desirable to avoid these and other problems associated with prior art systems. A need exists in the communications industry for a system and manner of obtaining reference information via wireless devices from other networks, while increasing flexibility and user convenience. The present invention provides a solution to the aforementioned and other shortcomings of the prior art, while offering additional advantages over the prior art.

SUMMARY OF THE INVENTION

To overcome limitations in the prior art described above, and to overcome other limitations that will become apparent upon reading and understanding the present specification, the present invention discloses a system, apparatus and method for communicating reference information to a wireless terminal operating within a wireless network. The wireless device is not limited to any preset navigation structure, and provides the ability to locally or remotely access reference information.

In accordance with one embodiment of the invention, a method is provided for presenting reference information to a user of a wireless terminal operating within a wireless network. Request identifiers are received upon entry by a user at the wireless terminal. The request identifiers identify reference information desired by the user. The reference information is presented to the user via the wireless terminal if the desired reference information is locally stored at the wireless terminal. If the reference information is not locally stored, the request identifier is transmitted to a data server operating within a second network via a gateway bridging the wireless network and the second network, and presented to the user if available via the data server.

In accordance with more particular embodiments of the invention, reference information obtained from the data server may thereafter be locally stored on the wireless device. Predetermined storage conditions that indicate whether or not the reference information will be locally stored are monitored, and the information is stored if the conditions are met. Other embodiments also include establishing predetermined activity conditions, and determining whether such activity condition is met, in which case a default activity is initiated.

In accordance with another aspect of the invention, a wireless device is provided for initiating requests for reference information from a wireless network, and obtaining requested reference information in response thereto. The wireless network is configured to communicate with a second network having an information server via a gateway. The device includes an input user interface to receive the requests for reference information, and a memory to store reference information received at the wireless terminal. An output user interface on the wireless device presents the reference information corresponding to the request to the user. The device includes a processor configured to search the memory for the reference information corresponding to the request. The processor as configured transmits the requests for reference information to the information server in the second network if the reference information is not locally stored in the memory, and the reference information obtained from either the memory or the information server is presented via the output user interface.

In accordance with another embodiment of the invention, a communication system for communicating reference information is provided. The communication system includes a network of computing systems and a wireless network, and the computer network includes a data server, such as a dictionary server. A gateway computing system is configured to bridge communications between the computer network and the wireless network. Wireless devices communicate via wireless transmissions within the wireless network, and communicate with the data server in the computer network via the gateway in accordance with a predefined protocol, such as WAP. The wireless device includes an input user interface to receive the requests for reference information, a memory to store reference information received at the wireless device, and an output user interface to present the reference information corresponding to the requests. A processor within the wireless device is configured to search the memory for the reference information corresponding to the request, transmit the requests for reference information to the dictionary server to obtain the reference information from the dictionary server if the reference information is not stored in the memory, and present the reference information obtained from either the memory or the dictionary server via the output user interface.

The above summary of the present invention is not intended to describe each illustrated embodiment or implementation of the present invention. This is the purpose of the figures and the associated discussion which follows.

BRIEF DESCRIPTION OF THE DRAWINGS

FIG. 7, including

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is generally directed to a system and method for obtaining reference information, such as dictionary definitions, language translations, telephone directory information, etc., via a wireless terminal operating within a wireless network. The present invention allows a request identifier to be entered at the wireless terminal, where the request identifier identifies the informational content that is requested by the user. In one embodiment of the invention, such requests are transmitted between the wireless network and another network, such as an intranet or the Internet, using the Wireless Application Protocol (WAP). The request is transmitted via the wireless terminal or WAP terminal to a server computing system configured to operate in the Internet environment. The content identified by the request is thereafter transmitted from the server computing system back to the wireless or WAP terminal to be presented to the user via the wireless or WAP terminal. The local memory of the wireless device may be searched prior to transmitting the request to the data server, thereby eliminating the need to access the information from the remote server.

Figure 1:
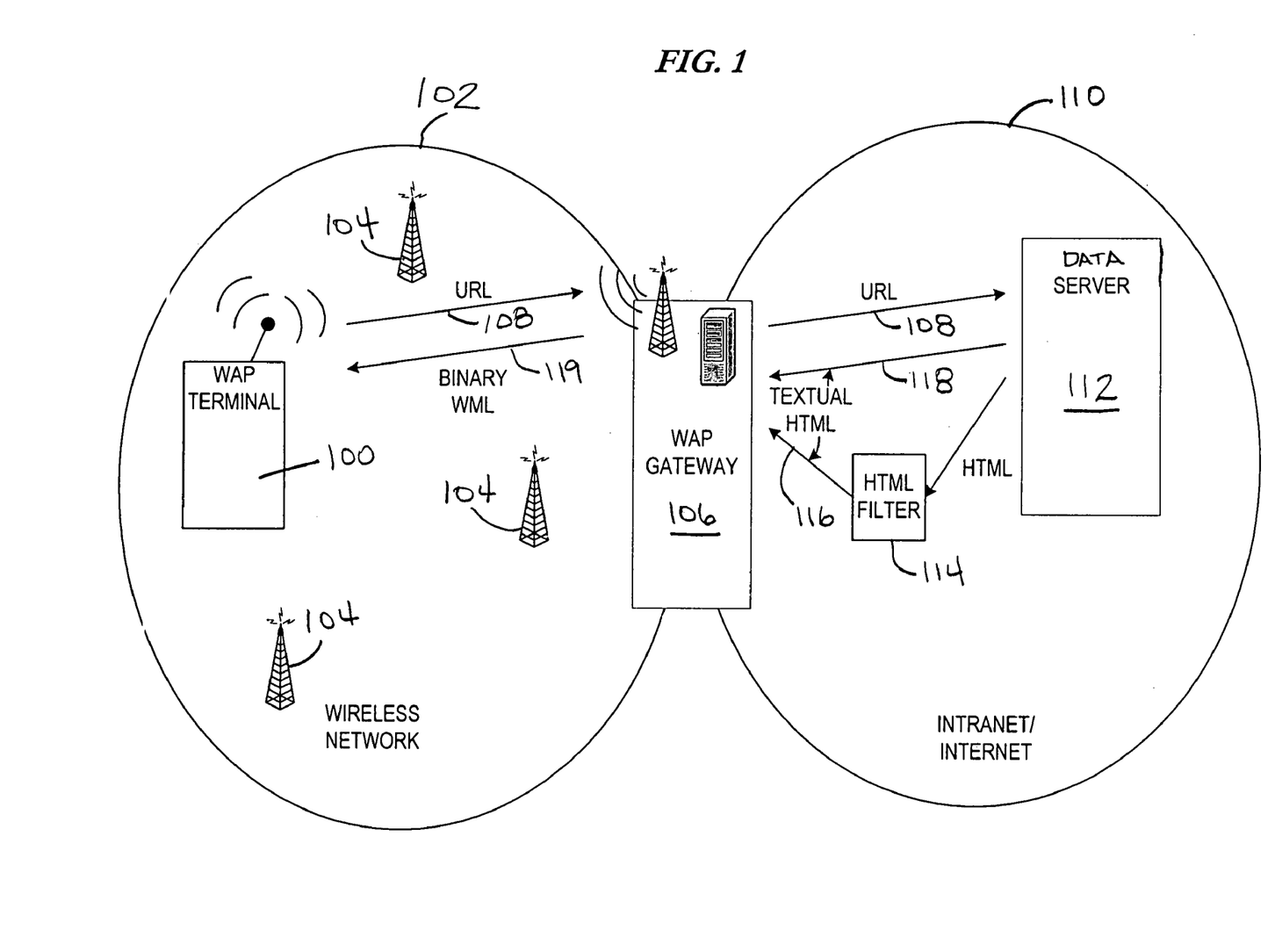
FIG. 1 is an exemplary embodiment of a networking environment in which the principles of the present invention may be applied.

FIG. 1 is an exemplary embodiment of a networking environment in accordance with the present invention. In this embodiment, a WAP terminal 100 operates within a wireless network 102, for example, a GSM (global system for mobile communication) network, or advanced GSM networks such as GPRS (General Packet Radio Service), HSCSD (High-Speed Circuit-Switched Data), or other type of second generation (2G) or third generation (3G) networks. Further examples of such networks include, but are not limited to, WCDMA (Wideband Code Division Multiple Access), EDGE (Enhanced Data Rates for Global Evolution), CDMA 2000, and cdmaOne to name a few. The present invention is also applicable to other wireless networking technologies that are capable of integration with other networks such as intranets and the Internet. Within the wireless network 102, the WAP terminal 100 may communicate with other wireless devices or landline devices as facilitated by, for example, base stations 104.

A request for information is transmitted from the wireless network 102 to the WAP gateway 106 by way of a Uniform Resource Locator (URL), generally using the Wireless Session Protocol (WSP), which is essentially a binary version of HTTP. The URL 108 is an address to the requested information that is available on a network 110, such as an intranet or the Internet. The WAP gateway 106 converts content directed to the WAP terminal 100 into a format that the WAP terminal 100 can understand, such as binary Wireless Markup Language (WML). Viewing from the intranet/Internet side, the WAP gateway 106 forwards the URL to the appropriate destination, and can provide additional information about the WAP device through HTTP headers, such as the subscriber number of a WAP-capable cellular phone, its cell ID, location, etc.

More particularly, the URL 108 is transmitted from the WAP gateway 106 using, for example, HTTP, to a server computing system such as the data server 112. The request transmitted in the form of URL 108 is a request for the data server 112 to return definitional content such as a dictionary definition, translation, telephone directory information, instructional or "help" information, or other definition depending on the nature of the request. The data server 112 returns the requested content to the WAP gateway 106, which is ultimately perceivable by the WAP terminal 100. In one embodiment, the requested content is provided by the data server 112 in HTML format to an HTML filter 114 that filters out graphics and other content in order to provide textual HTML as depicted by line 116. The data server 112 may directly provide textual HTML as depicted by line 118. In either case, the WAP gateway 106 receives the textual HTML content, and converts the textual HTML content to binary WML as shown on line 119 for processing and presentation at the WAP terminal 100. It should be recognized that HTML filtering is optional, and depends on the capabilities of the particular WAP terminal. The HTML filter 114 is illustrated for purposes of example, and the requisite filtering of Web content such as graphics depends on the ability of the WAP terminal 100 to present such content.

Figure 2:
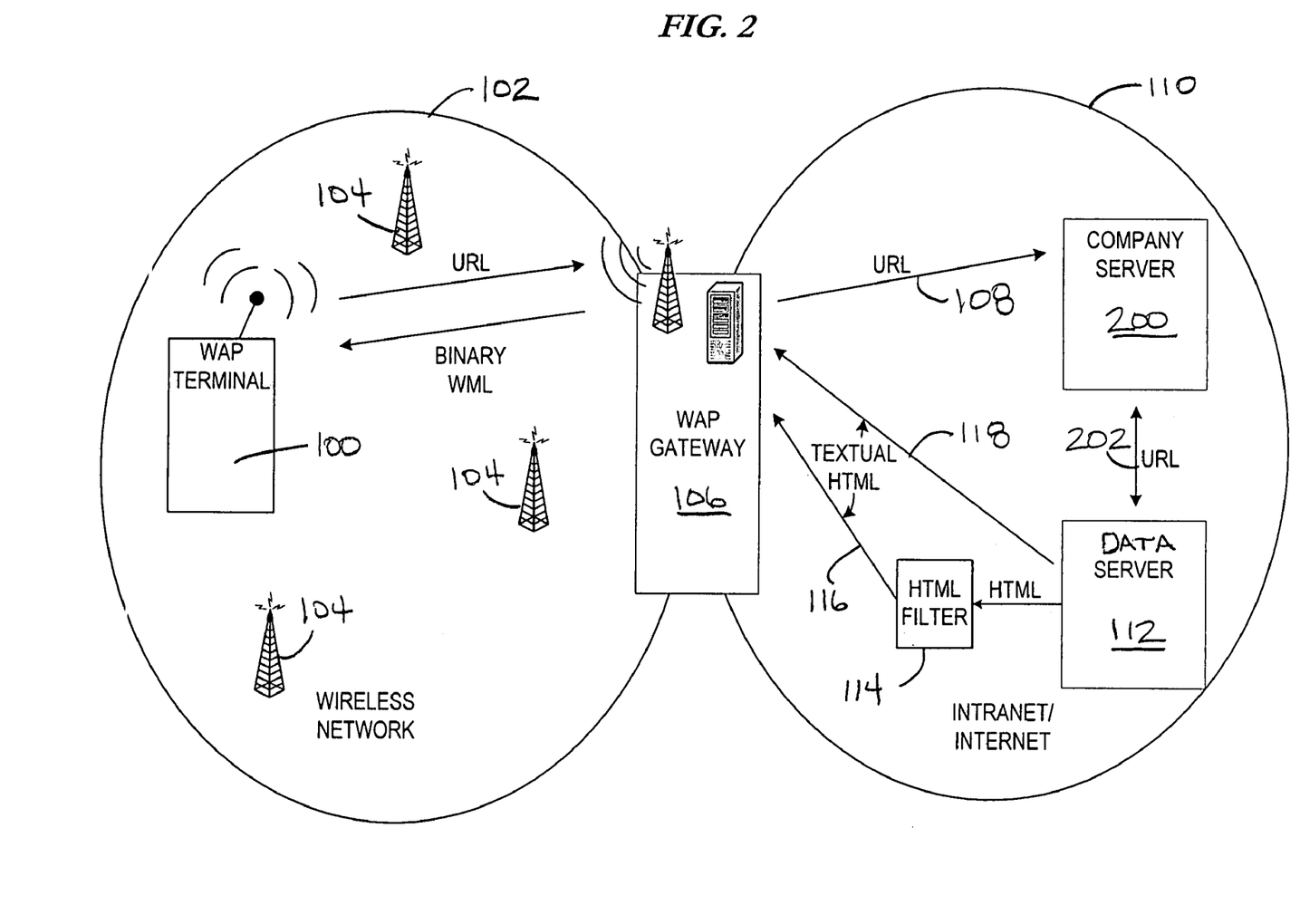
FIG. 2 is an exemplary embodiment of an intranet or LAN environment in which the principles of the present invention may be applied.

The data server 112 may alternatively be configured in an intranet or local area network (LAN). One such example is provided in FIG. 2, where the network 110 is depicted as an intranet environment. The intranet 110 may be architecturally configured to directly communicate with the WAP gateway, or alternatively may be "behind" the Internet. In this example environment, the URL 108 is transmitted from the WAP gateway 106 to a company server 200. One or more entities can retrieve dictionary information from the data server 112 via the company server(s) 200. The company server 200 provides the URL 202 to the data server to identify the desired content, which is transmitted back to the WAP gateway 106 as textual HTML depicted by lines 116, 118. This network environment 110 of FIG. 2 can be publicly accessible, or may have limited access to particular entities, companies and individuals that have registered and/or paid for the particular service, such as a dictionary service. As can be seen, the present invention may be implemented in connection with any network that can communicate with the WAP gateway 106, and includes various multi-node network structures such as multipoint, star, ring, loop, mesh, etc. network topologies used in networks ranging from local area networks (LAN) to proliferative global area networks (GAN) such as the Internet.

Figure 3:
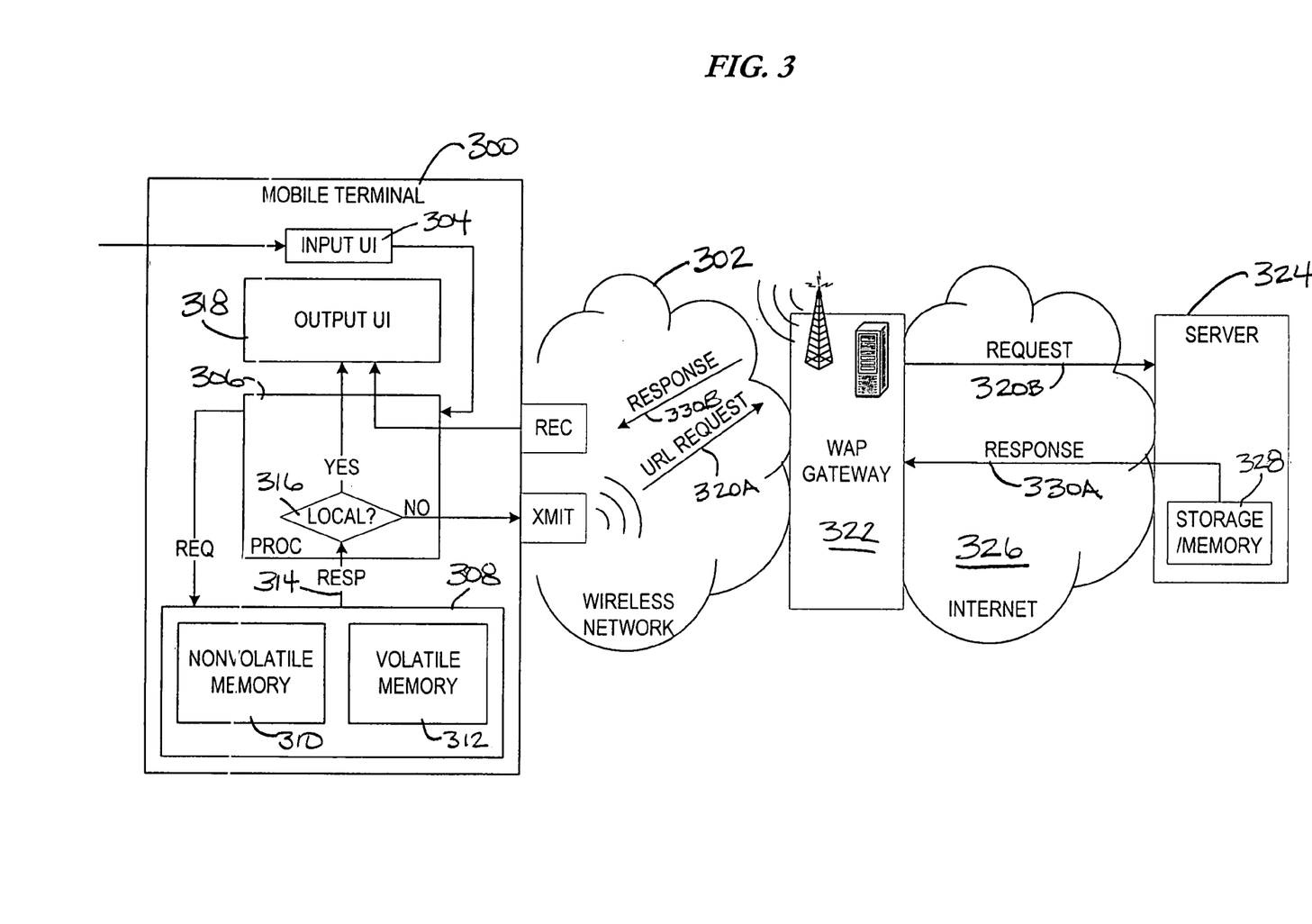
FIG. 3 is a block diagram illustrating a more particular embodiment of a dictionary service that may be utilized with a WAP terminal in accordance with the invention.

FIG. 3 is a block diagram illustrating a more particular embodiment of a dictionary service in accordance with the invention. A wireless device 300 is operable in a wireless network 302 to engage in wireless communication. In the example of FIG. 3, the wireless device represents a mobile terminal 300 such as a handheld PC, personal digital assistant (PDA), mobile telephone, or other device capable of wireless communication. The mobile terminal 300 is WAP-compliant for transmitting WAP requests and receiving digital data, such as Web content and e-mail, in response. An input user interface (UI) 304 on the mobile terminal 300 allows the mobile terminal user to submit requests for data at the mobile terminal 300.

The requests are submitted through the use of a software program, such as a WAP service which need not be stored or otherwise dependent on the mobile terminal memory. When connected to the WAP service, such as a WAP dictionary service, the WAP service itself provides the navigational capabilities. The service is thus an easily modified, non-permanent service with respect to the mobile terminal. Software, service features, and other configuration aspects of the service can be modified, and thus applied to all users of the WAP service. In this manner, the mobile terminal is not limited to any preset navigation constraints. In another embodiment of the invention, portions of the software and navigation may be locally stored on the mobile terminal, while additional aspects of the navigation subject to change are supplied via the WAP service. As described more fully below, the present invention allows certain requested data to be locally stored at the wireless device, yet the operational aspects of the service may be stored external to the wireless device. In this manner, the service is allowed to change, but the user can selectively store requested information or content provided by the service.

Returning to FIG. 3, the request is processed, such as by processor 306, such that it is first determined whether the requested content is locally stored in the mobile terminal 300. For example, the local storage 308 is searched to determine whether the requested content is locally stored. The local storage 308 may include, for example, nonvolatile memory 310 and/or volatile memory 312.

The processor 306 analyzes the response 314 to determine 316 whether or not the requested content was locally stored in the mobile terminal 300 itself. If the requested information is resident in the local storage 308, the requested information is presented to the user via an output user interface 318, such as a display or audio output. If the requested information is not locally stored, the mobile terminal 300 transmits the request via the wireless network 302 in the form of a URL request 320A, where it is ultimately directed to the WAP gateway 322. The WAP gateway 322 forwards the URL request 320B to the destination server 324 via the Internet 326. As previously indicated, the URL request 320A in the wireless environment 302 may utilize a first protocol (e.g., WSP), where the URL request 320B transmitted from the WAP gateway 322 utilizes a second protocol intelligible to the server 324 (e.g., HTTP).

Upon receipt of the URL request 320B at the server 324, the requested content is retrieved from the storage/memory 328 if it exists at the server 324. A response 330A providing the requested content is transmitted back to the WAP gateway 322 via the network 326, and the response 330B is provided to the mobile terminal 300 via the wireless network 302. Again, the response 330A in the network environment 326 may utilize a first protocol (e.g., HTTP), where the response 330B transmitted from the WAP gateway 322 utilizes a second protocol intelligible to the mobile terminal 300 (e.g., WSP).

As described more fully below, content received from the server 324 by the mobile terminal 300 may then be locally stored in the storage 308 of the mobile terminal 300. In this manner, the mobile terminal 300 can selectively store certain information or content locally, so that subsequent requests for that particular information or content is readily accessible to the mobile terminal 300 without requiring further access to the server 324. For example, where the requested information is a dictionary definition or a language translation of a word or phrase, a request for the definition or translation will first involve checking the local memory to determine whether the definition or translation is stored locally. If so, the mobile terminal 300 can present the definition/translation to the user without accessing the server 324. If the definition/translation is not locally stored, a WAP service can be accessed by the mobile terminal 300 to obtain the requested definition/translation from an intranet or Internet dictionary server 324, which can thereafter be locally stored if desired. This provides greatly increased flexibility and efficiency, as all of the information need not be stored in the local storage 308, which may be prohibitive due to the capacity limitations of the local storage of such mobile devices. Further, all of the information need not be obtained from the server 324 using the WAP service each time a definition or translation is desired, since selected information may be locally stored. Selectively storing some of the definition/translation information locally thereby reduces the number of required WAP service transactions, which are more time consuming, and may further be associated with a service transaction fee.

Figure 4:
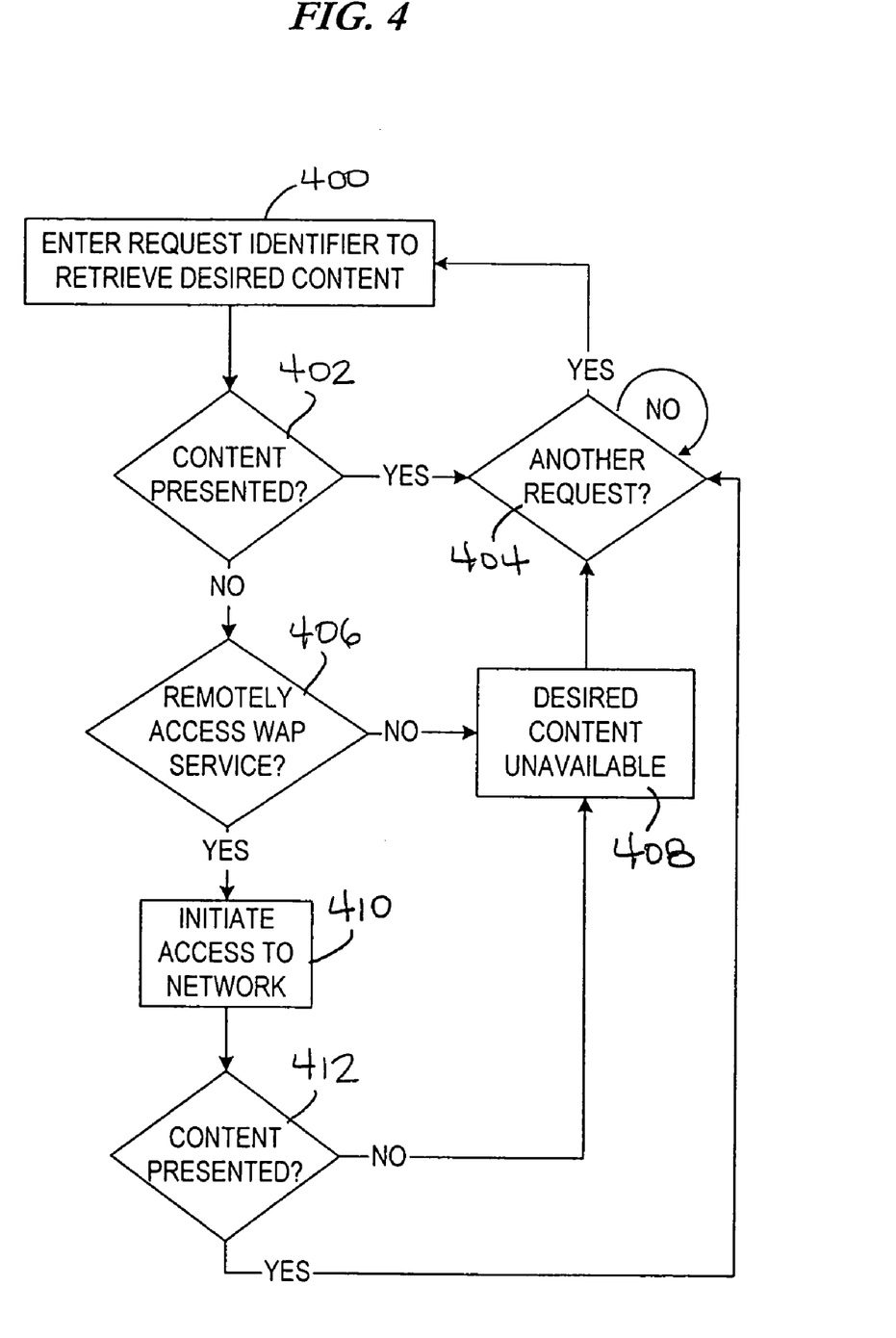
FIG. 4 is a general flow diagram of one embodiment of the invention illustrating a method in which a user may obtain reference information, such as dictionary and language translation information, via a wireless terminal.

FIG. 4 is a general flow diagram of one embodiment of the invention illustrating a method in which a user may obtain reference information, such as dictionary and language translation information, via a wireless terminal. The user enters a request identifier to retrieve the desired content, as shown at block 400. The request may be entered via a local program, or preferably via a WAP service. An example of a request identifier is a word in which the user would like a definition or language-to-language translation. A request identifier is entered via a user interface, such as a text entry field viewable on a display of the mobile terminal. Text corresponding to the request may be entered via a keyboard associated with the mobile terminal, or through the use of a rolling "mousewheel" or other buttons on the mobile unit. The request identifier may also be entered via other or additional user interfaces, such as an audio input capable of receiving voice commands or other sound commands. Other known user interfaces may also be used within the scope and spirit of the invention, including Graphical User Interfaces (GUI) and GUI selection tools such as a mouse, joystick, keyboard, touch screen, head mounted display, etc.

After entering the request, the content may be presented to the user, such as via a display, audio output, etc. If the content is presented to the user as seen at decision block 402, the content is locally stored, and is readily available for presentation to the user. The user may thereafter make another request, and if the user decides to do so as seen at decision block 404, the user will enter 400 another request identifier to retrieve the desired content.

If the content is not presented to the user upon entering the request, the user may be presented with an option to remotely access the WAP service to obtain the information from a designated intranet or the Internet, as seen at decision block 406. Accessing information remotely via a particular WAP service may be associated with a WAP service transaction fee, for example, and the user may choose not to access the WAP service information if the desired content is not locally available. If the user chooses not to retrieve the information by accessing the network via the WAP service, and the content was not locally available, the desired content is unavailable to the user as seen at block 408. If the user opts to access information via the WAP service, access to the intranet/Internet via the WAP service is initiated 410.

In accordance with one embodiment of the invention, the user takes an affirmative action to initiate 410 the WAP service, such as pressing a button, entering or speaking a command, or the like. Such action initiates the WAP service to search for the desired content corresponding to the request identifier on the network server, e.g., initiates a WAP service to search for a dictionary definition of the requested word or phrase on a dictionary server on the Internet. In one embodiment of the invention, a threshold is defined, such that crossing this predetermined threshold will cause the WAP service to be initiated. One such example is a predetermined time duration, such as a predetermined number of seconds. If the option to initiate the WAP services is highlighted or is otherwise the default option, expiration of the predetermined time duration will automatically cause the WAP service to be initiated. The default option may alternatively be set to perform other functions, such as a link to an instructional or "help" screen, which may be locally stored or may be a particular card of the proposed WAP service deck. Thus, one example would be that a message appears after ten seconds indicating that obtaining a dictionary definition or language translation using the WAP service will require the user to log on to the service, and/or pay for the service. The user may then opt to access the WAP service, or to forego obtaining the desired information. Expiration of another predetermined time duration may optionally cause another default action to occur, such as initiating the WAP service, presenting a log-on interface, or indicating that the WAP service will not be accessed.

If the desired content is thereafter presented, as determined at decision block 412, this indicates that the desired content was available on the network server, e.g., a dictionary server. In this case, the user can view, listen to, or otherwise perceive the resulting content. If the content was not available on the network server, the desired content is unavailable to the user as seen at block 408.

In either case, the user may thereafter make another request, and if the user decides to do so as seen at decision block 404, the user will enter 400 another request identifier to retrieve desired content.

Figure 5:
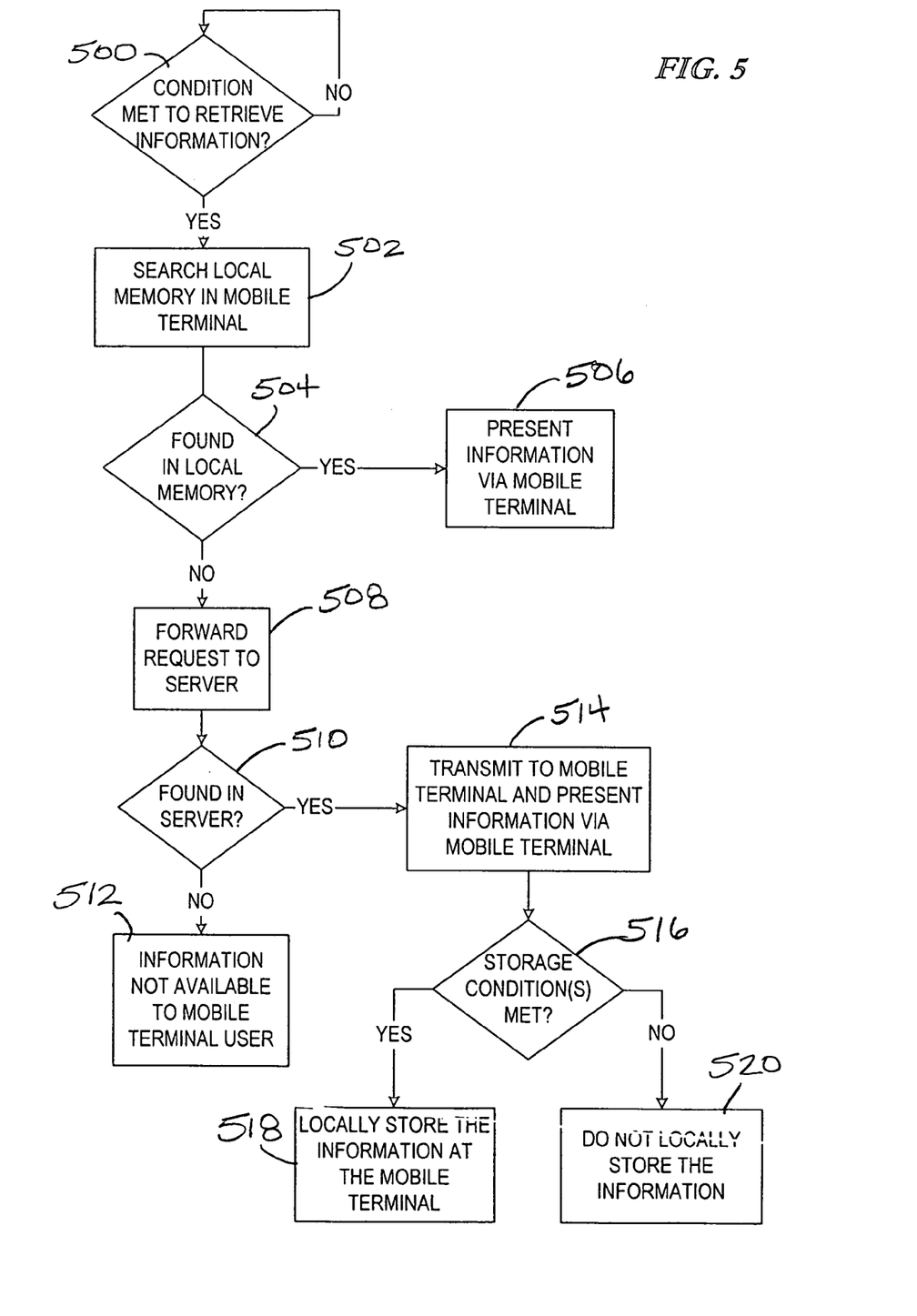
FIG. 5 is a flow diagram illustrating one embodiment of a method for selectively retrieving information via a wireless device in a wireless network in accordance with the present invention.

FIG. 5 is a flow diagram illustrating one embodiment of a method for selectively retrieving information via a wireless device in a wireless network in accordance with the present invention. The wireless terminal user uses the WAP terminal to browse the particular service, such as the dictionary or translation service. Preset conditions may be defined that identify the condition that must be met before taking action to retrieve the requested information. These conditions include preset threshold levels or other preset conditions. For example, a preset threshold may be represented by a preset time limit such that after the user has idled the browser cursor for a predetermined length of time on a hyperlink, or has idled for a predetermined length of time after entry of a word or phrase that is the subject of the request, the condition may be deemed to be met. A predetermined time duration may be set to, for example, ten seconds, so that a cursor position corresponding to a hyperlink will activate the hyperlink upon expiration of the ten second duration. An example of a preset condition also includes entry of the user request itself, or acceptance, verification or acknowledgment to retrieve the dictionary/translation information to the requested word or phrase. A more particular example includes the user entering the word to be defined or translated, and takes an affirmative action to initiate the request, such as pressing a button on the mobile device, entering a command, or speaking a specific sound to fulfill the condition to retrieve the information.

The flow diagram of FIG. 5 thus assumes that a preset condition or threshold has been designated. If the condition is not met to retrieve the information as determined at decision block 500, no attempt to obtain the information will be made. When the condition has been met, the local memory is first searched 502 to determine whether the requested information is locally stored on the wireless device. If the information is found in the local memory as determined at decision block 504, the information is presented 506 via the mobile terminal. Otherwise, if the information is not found in the local memory as determined at decision block 504, the request is forwarded 508 to a server computing system associated with an intranet, the Internet, or other network configuration. If the information is not available in the server computing system as determined at decision block 510, the information is unavailable to the mobile terminal user as depicted by block 512. Otherwise, the information located in the server computing system is transmitted 514 to the mobile terminal and presented via an output user interface of the mobile terminal. When received at the mobile terminal, the information may optionally be stored in the local storage of the mobile terminal. If certain predetermined storage conditions are met as determined at decision block 516, the information will be locally stored 518 at the mobile terminal. Otherwise, if the storage conditions are not met, the information will not be locally stored as seen at block 520, and subsequent requests for that particular information will need to again be retrieved from the server computing system.

One or more predetermined storage conditions may be implemented, whereby storage of the information at the mobile terminal is determined by monitoring the predetermined conditions at decision block 516. In one embodiment, the predetermined storage condition is the requisite quantity of storage space or memory space at the mobile terminal. If sufficient storage/memory space allocated to dictionary/translation storage is present, the resulting information will be locally stored. Another example storage condition is that a particular word was accessed a predetermined minimum number of times. For example, if a particular translation or definition of a word is accessed at least three times, it will be locally stored. This can also be extended to the situation where the request occurs a predetermined number of times in a predetermined time period, such as three times within one week.

Another predetermined storage condition in accordance with the present invention relates to the frequency in which definitions/translations of particular words or phrases are requested. In one embodiment of the invention, the usage frequency of each of the requests is stored. For example, when a request is made for a language translation of a particular word or phrase, a usage indicator is incremented or otherwise stored to record the occurrence of the request for this particular word or phrase. Each requested word/phrase is monitored such that its corresponding use count is incremented each time a definition or translation of the word/phrase is requested. In this manner, the local storage/memory at the mobile terminal may store a predetermined number of requested words and the corresponding dictionary/translation information, depending on which are the most frequently requested. For example, the twenty most frequently requested words or phrases, and their corresponding definitions and/or translations, may be locally stored at the mobile terminal. The usage frequency may be determined by maintaining a cumulative total of each term requested, and those requests (and corresponding information) having the highest cumulative number of requests will be locally stored. An analogous embodiment includes storing a predetermined number of the most recently accessed words, whether or not they are the most frequently used. For example, the twenty most recently requested dictionary definitions may be stored, and the oldest requested dictionary definition currently being stored may be removed from storage to accommodate storage of the most recent request.

The usage frequency may also be determined by introducing a time variable to the cumulative use count. In such a case, the recorded use count for a word may from time to time be decremented if the definition/translation for that word has not been requested for a predetermined time period. In this manner, a word that at an earlier time had been requested often, but is no longer requested often, will eventually lose it's storage "strength," thereby giving way to more recently requested words to be locally stored. For example, if an English-to-Finnish translation of the word "enthusiasm" had been requested ten times (i.e., use count equals 10) a month ago, but had not been requested since, the storage strength of the request for "enthusiasm" may be diluted by decrementing the use count (ten) by one for every week that the word is not requested. If the word "enthusiasm" had not been requested for one month, the use count would decrease to six. Therefore, a new word that had been requested seven times could supplant the word "enthusiasm" in the local storage.

If the storage/memory allocated to storing this information has reached its capacity, currently-stored information can be expunged where it is the least likely to be accessed again, based on the statistical information regarding the words/phrases currently being stored. One such example was described above in connection with decrementing a use count upon lack of it being requested. In another example, the information having the longest time duration since it was last requested can be expunged from the local memory to make room for the new word/phrase information. In another example, where the predetermined storage condition is based on the number of times the particular word/phrase is requested, the locally-stored word/phrase corresponding to the least number of requests can be expunged to make room for locally storing a request meeting the minimum local storage entry threshold.

Figure 6:
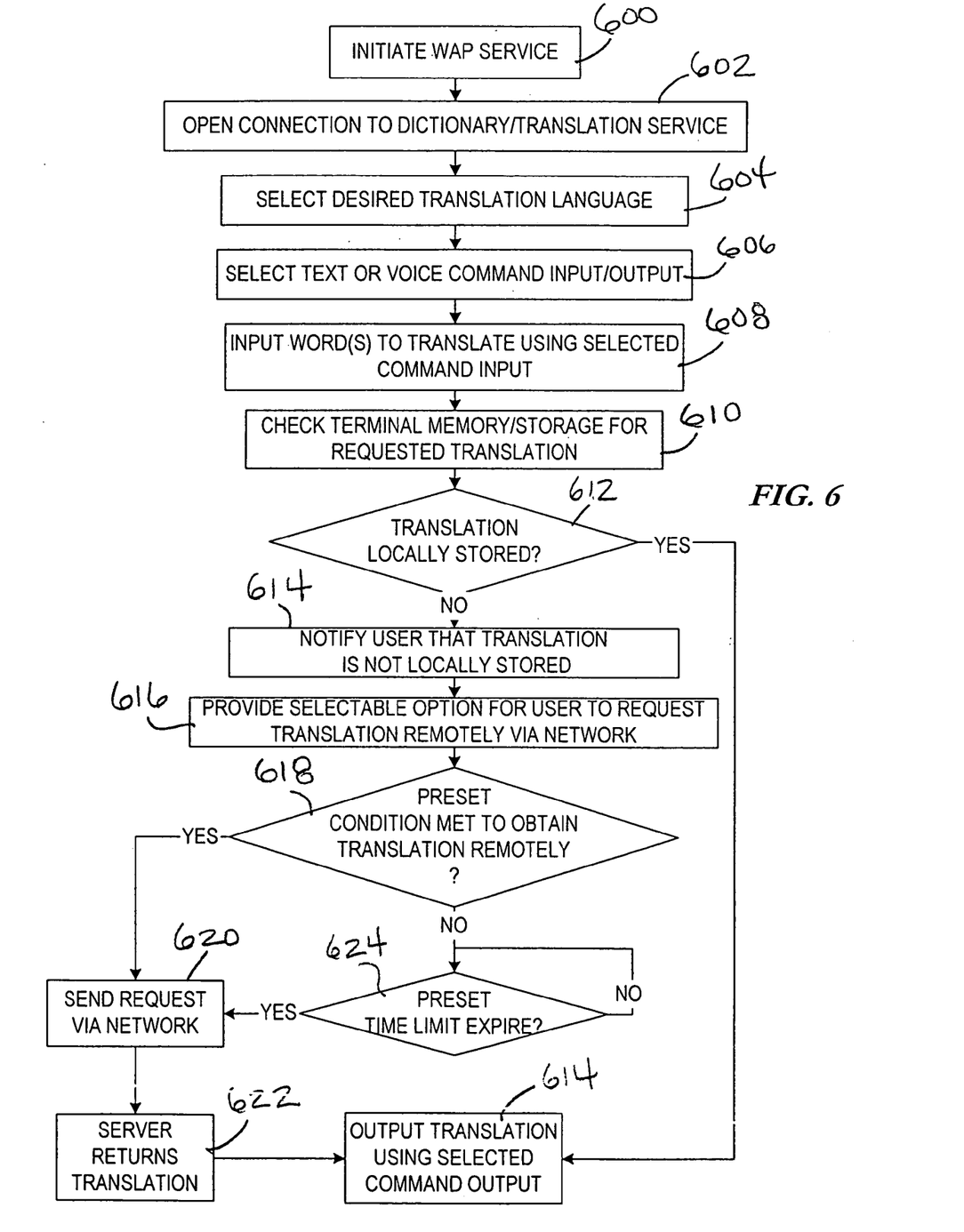
FIG. 6 is a flow diagram a more particular embodiment of a method for obtaining dictionary translation information using a WAP terminal in accordance with the present invention.

FIG. 6 is a flow diagram illustrating a more particular embodiment of a method for obtaining dictionary and translation information using a WAP terminal. The user of the WAP terminal initiates the WAP service 600 which in the instant example is a service to provide dictionary definitions and/or language translations of words or phrases. The user opens 602 the connection to the dictionary/translation service. It will be assumed for purposes of this example that the user wants to obtain a translation to a particular word or phrase. The user therefore selects 604 the desired translation language, and more particularly, identifies the language-to-language translation desired (e.g., English to Finnish). The user may then select the particular input user interface and/or output user interface that the user would like to use, as seen at block 606.

The request identifier, in this example the word or words to be translated, is input 608 to the translation service using the selected command input. For example, a word to be translated from English to Finnish can be entered via a text entry field, or by speaking the word to be translated. Once the word or words have been entered at the WAP terminal, the memory/storage at the WAP terminal is checked 610 to determine whether the requested translation is resident in the memory/storage of the WAP terminal. If it is determined 612 that the translation is locally stored, the translation content is output 614 using the selected command output such as a display or audio output.

If it is determined 612 that the translation is not locally stored, the user is notified 614 that the translation is not locally stored, and provided in a selectable option to request the translation remotely via a network as shown at block 616. In this case, the requested will be sent from the WAP terminal to an intranet or the Internet via a WAP gateway in order to retrieve the requested translation from a dictionary server in the intranet or Internet. Before the request for the translation from the network is issued, it is determined 618 whether a preset condition to obtain the translation remotely has been met. Such a preset condition may include the user's affirmative acceptance to obtain the translation from the remote network such as by entering the word to be translated and pressing a button, entering a command, or speaking a specific sound and order to initiate the request. If the preset condition has been met, the request will be sent via the network as shown at block 620, and a dictionary server associated with the intranet or the Internet will return 622 the translation, and the translation content is output 614 using the selected command output. If, on the other hand, the preset condition is not met as determined at decision block 618, it is determined 624 whether or not a preset time limit has expired. A predetermined default function is performed upon expiration of the preset time limit, such as presenting further information to the user such as instructional information or pricing information, or alternatively may default to initiating the request to dictionary server. In the illustrated embodiment, the default action to occur at expiration of the preset time limit is to send 620 the request for the translation to the dictionary server associated with the intranet or Internet. The dictionary server associated with the intranet or Internet returns 622 the translation, and the translation content is output 614 using the selected command output. As was described in connection with FIG. 5, if certain preset storage conditions are met, the information received from the remote dictionary server may thereafter be stored in the local memory or other storage of the WAP terminal. In this manner, the user obtains the requested translation either through local retrieval of the translation, or by accessing a remote server on a network, and once remotely accessed, may subsequently be able to access the translation locally.

Figure 7A:
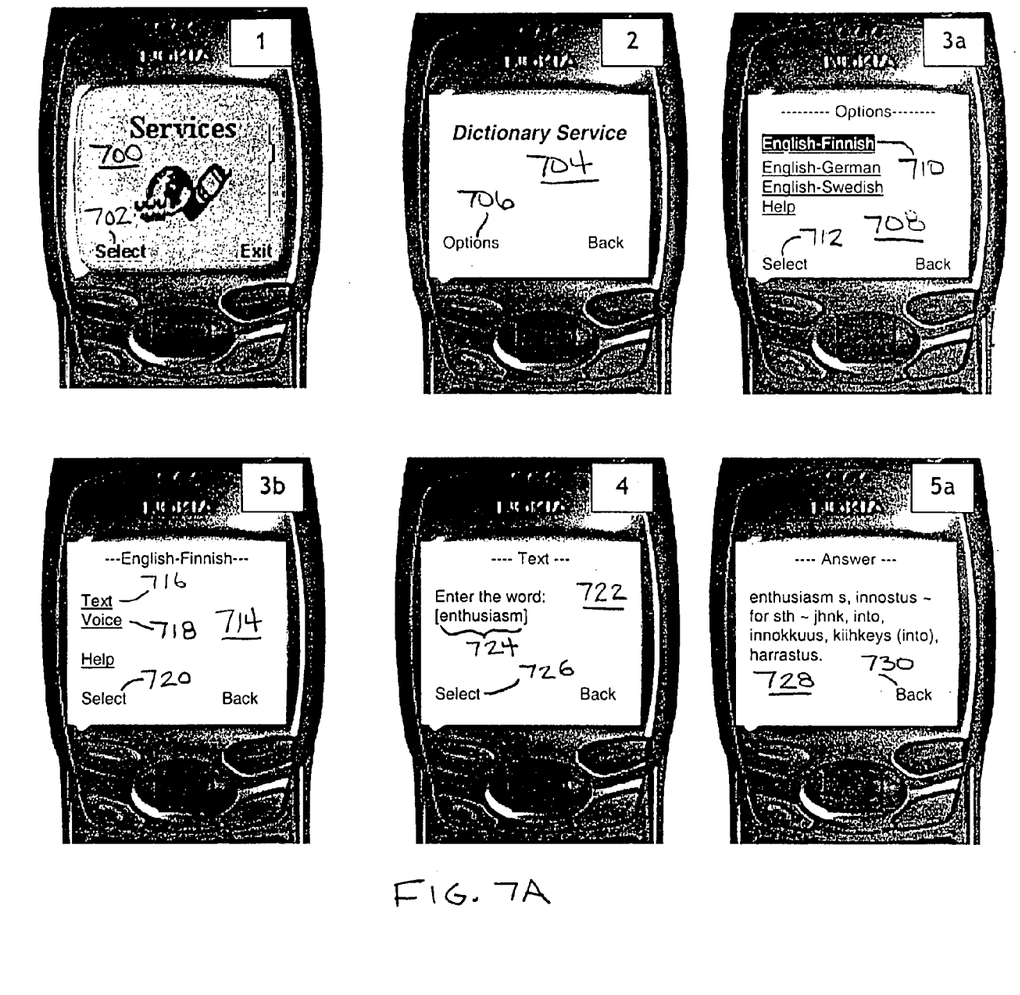
FIGS. 7A and 7B, illustrates a series of actions depicting the utilization of a dictionary service as carried out via a WAP terminal in accordance with the principles of the present invention.
Figure 7B:
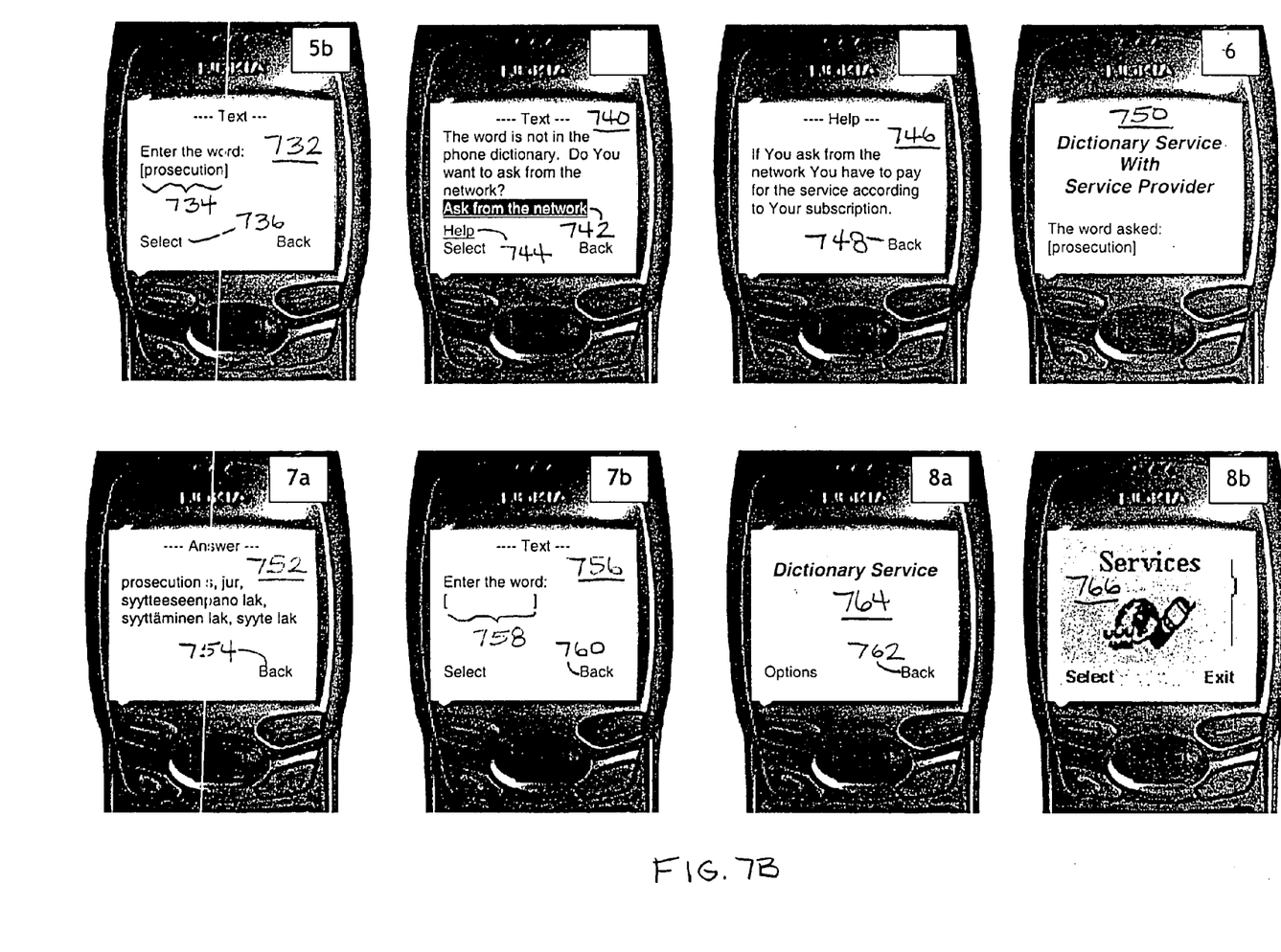

Referring now to FIG. 7, including FIGS. 7A and 7B, a series of actions as carried out via a WAP terminal are illustrated which depict the utilization of a dictionary service in accordance with the principles of the present invention. In this particular example, information is provided to the WAP terminal user via a display screen of the WAP terminal.

WAP terminal screen 700 depict a screen or "card" that is presented to the WAP terminal user to provide access to WAP services. If the user selects the Select button 702, which in this example is a hyperlink, the user will be directed to an introductory screen 704 for a dictionary service, for example. The user can select the "Options" link 706 which brings the user to screen 708 where the user can select one of a plurality of dictionary service options. For example, a plurality of language translation options may be presented to the user to allow the user to choose a translation from a first language to a second language. In the example screen 708, a translation from English-Finnish 710 is highlighted, and activation of the Select link 712 brings the user to screen 714. From the screen, the user is provided an option to input the request via a certain input mechanism. For example, the user may input the request by text entry 716, voice entry 718, or other selectable option. In this example, the user chooses the Text option 716 and activates the select link 720 to bring the user to a text entry screen 722 where the user can enter the request into a text entry field 724, which in this example is the word "enthusiasm" in which a Finnish translation and/or definition is sought. When the user chooses the Select link 726, it will first be determined whether the requested translation and/or definition is locally stored at the WAP terminal in accordance with the present invention. If so, screen 728 will be presented to the user which includes the resulting information or content requested by the user. In this example, the resulting content is a dictionary definition of the word "enthusiasm" provided in the Finnish language, retrieved from the local WAP terminal memory.

By selecting the Back link 730, the user may return to a text entry screen 732 in order to enter another request. In this example, the user enters the word "prosecution" in the text entry field 734, and chooses the select link 736 to bring the user to an information screen 740 that informs the user that the requested word(s) is not stored in the local memory. The user is asked whether or not a remote access request from the network should be performed. In the illustrated example, a default condition to ask from the network is provided, as illustrated by highlighting the link 742 to ask from the network. At this point, the user could carry out this request by performing a predefined condition such as selecting an OK button, speaking a command, or other action to effect the default action. In one embodiment, a predefined threshold is defined, such as a time duration of 10 seconds. If the user has taken no action within this predefined time duration, a default action will be taken. The default action might be to carry out the request from the network, or alternatively may be to provide further instructional information to the user. In the illustrated embodiment, the default action which occurs upon expiration of the predetermined time duration is to effectively select the "Help" link 744 which brings the user to screen 746 where further information is provided to the user. In the illustrated embodiment, the additional instructional information informs the user that if the user requests remote access to the desired content, the user will be required to pay for the service according to the user's subscription. The user may then select the "Back" link 748 to return to screen 740, or another predetermined time limit may expire which will automatically return the user to screen 740. The user may then decide not to perform the remote request, or may decide to obtain the desired content from the network by selecting the appropriate link via screen 740. If the user chooses to obtain the desired content from the remote dictionary server on the network, the user will be presented with a dictionary service associated with a service provider as shown via screen 750. The request identifier, in this case the word "prosecution," is sent from the WAP terminal through the WAP gateway to the dictionary server available on the intranet or internet. The remote server searches for the requested translation and/or definition, and returns the requested content through the WAP gateway back to the WAP terminal where it is presented via screen 752. The user is again presented with an option to move "Back"

754 to screen 756 where further words or phrases may be entered in the text entry field 758. If the user no longer needs to use the service, the user may select the "Back" link 760 and 762 on screen 764 to bring the user back to the initial services screen 766.

Figure 8:
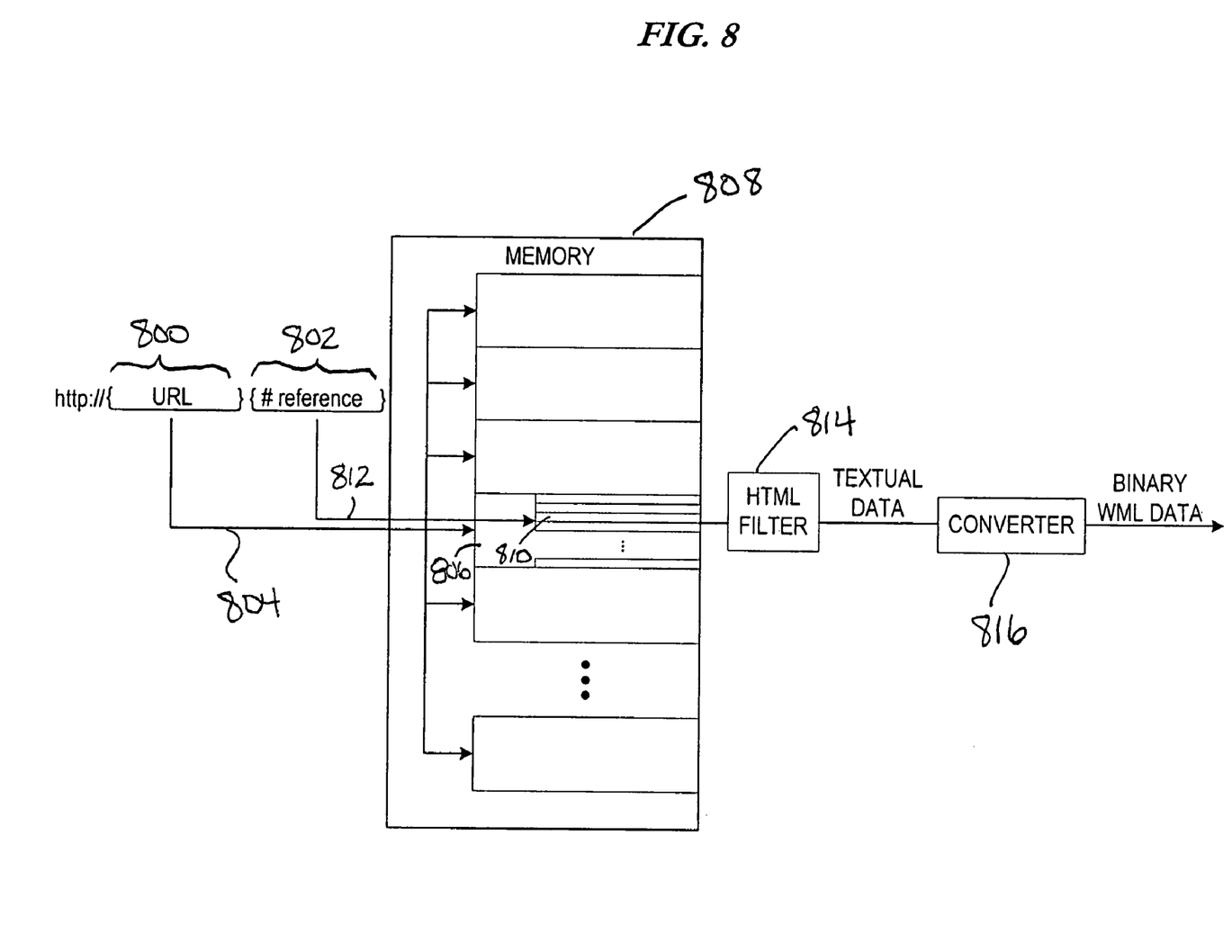
FIG. 8 is a block diagram illustrating one manner in which specific information requested at the WAP terminal is located at the network server and returned to the WAP terminal.

FIG. 8 is a block diagram illustrating one manner in which specific information requested at the WAP terminal is located at the network server and returned to the WAP terminal. When the user has chosen to retrieve desired content remotely using a WAP service, the request is sent by way of a URL (Uniform Resource Locator) 800. The URL may have an "anchor" or "reference" 802 appended thereto. The anchor is indicated by a certain character such as the sharp sign # followed by reference characters. The anchor is not technically part of the URL. Rather, it indicates that after the specified resource is retrieved, the portion of interest in the document identified by the URL is the portion having a tag identified by the reference. The meaning of a tag is resource specific. For example, the meaning of the tag "chapter" would be a dictionary explanation to the word chapter. This is depicted in FIG. 8 by line 804 which indexes the proper electronic content 806 within the network server memory 808, and further locates the desired content 810 in the memory 808 using the reference 802 as depicted by line 812. In this manner, requests sent via a WAP terminal may more precisely identify the desired content at the remote server.

The desired content 810 is retrieved from the memory 808 and pass through a filter 814, which in one embodiment is an HTML filter. The output of the HTML filter 814 is textual data which is information having only textual content, i.e., no extra application data or multimedia data. For example, if an accessed dictionary server transmits data having textual data and GIF images attached to the data, the HTML filter 814 filters out the GIF images and passes only the textual data. Thus, where the dictionary server sends data in a format other than a pure textual format, the HTML filter 814 filters the non-textual data out of the information to be returned to the user at the WAP terminal. Other filters may be used, depending on the capabilities of the WAP terminal. For example, a particular WAP terminal may be able to accept and recognize a certain format of images, such as a PDF file. In this instance, the filter used would pass textual data and PDF content. A WAP terminal capable of receiving, recognizing and presenting all information formats associated with the actual stored content would require no filtering functions. In this example, the textual data passed by the HTML filter 814 is provided to a converter 816. The converter 816 converts the textual data into a format recognizable by the WAP terminal, such as binary WML data.

The local storage capabilities and selectable remote access features of the present invention are also applicable to other WAP services. For example, services having the capability to download information to the WAP terminal which can be locally stored include banking services and financial information, news, market information, sports scores, weather, etc. Still other informational reference material associated with a service, such as a WAP service, may also be used in connection with the present invention. A telephone directory is one such example, in which particular telephone directory information may be locally stored on the wireless device, while the service is supplied via the WAP system. Predetermined conditions can determine which of the collective directory units are to be stored (e.g., all directory information associated with particular contacts) or alternatively can determine which directory fields are to be stored. An HTML-WML filter associated with a WAP server or WAP gateway may be used for converting the requested information on the network to information that is perceivable and may be stored on the wireless device. Other services are also applicable in accordance with the teachings of the present invention.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, fixed (hard) disk drives, diskettes, optical disks, magnetic tape, semiconductor memories such as RAM, ROM, PROMS, etc. Transmitting devices include, but are not limited to, the Internet, intranets, electronic bulletin board and message/note exchanges; telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method for providing reference information to a user of a wireless terminal operating within a wireless network, comprising:

receiving a request identifier entered by the user at the wireless terminal to identify desired reference information corresponding to the request;

presenting the desired reference information to the user via the wireless terminal if the desired reference information is locally stored at the wireless terminal;

transmitting the request identifier from the wireless terminal to a data server, if the desired reference information is not locally stored at the wireless terminal;

presenting the desired reference information obtained from the data server if the desired reference information is available on the data server;

determining whether a predetermined activity condition is fulfilled including determining whether there is user input inactivity for a predetermined time period; and initiating a default activity upon fulfillment of the predetermined activity condition including executing a function corresponding to a default link associated with navigational software provided at the wireless terminal, wherein the function corresponding to the default link is executed upon expiration of the predetermined time period.

2. A wireless device for initiating requests for reference information from a wireless network and obtaining requested reference information in response thereto, wherein the wireless network is configured to communicate with a second network having an information server via a gateway, the wireless device comprising:

an input user interface to receive the requests for reference information;

a memory to store reference information received at the wireless device;

an output user interface to present the reference information corresponding to the requests;

a processor configured to search the memory for the reference information corresponding to the request, to transmit the requests for reference information to the information server in the second network to obtain the reference information from the information server if the reference information is not stored in the memory, and to present the reference information obtained from either the memory or the information server via the output user interface and further configured to locally store the reference information obtained from the information server at the wireless terminal, monitor at least one predetermined activity condition, and to initiate a default activity upon fulfillment of the predetermined activity condition wherein the predetermined activity condition is a predetermined time period, and the default activity is a search for the reference information performed upon expiration of the predetermined time period.

3. A method for providing reference information to a user of a wireless terminal capable of operating within a wireless network, comprising:

receiving a user-entered request identifier at the wireless terminal which identifies desired reference information corresponding to the request;

determining whether the desired reference information is locally stored at the wireless terminal;

if the desired reference information is locally stored at the wireless terminal:
obtaining the desired reference information from the wireless terminal; and
presenting the desired reference information obtained from the wireless terminal;

if the desired reference information is not locally stored at the wireless terminal:
notifying the user that the information is not locally stored;
establishing a connection between the wireless terminal and a data server operating within a second network via a gateway bridging the wireless network and the second network;
transmitting the request identifier from the wireless terminal to the data server obtaining the desired information from the data server; and
presenting the desired reference information obtained from the data server.

4. The method of claim 1, further comprising providing navigational software delivered at least in part via a WAP service to the wireless terminal, to facilitate entry of the request identifier and transmission of the request identifier to the data server if the desired reference information is not locally stored at the wireless terminal.

5. The method of claim 1, further comprising locally storing the reference information obtained from the data server at the wireless terminal.

6. The method of claim 5, wherein storing the reference information at the wireless terminal further comprises monitoring at least one predetermined storage condition indicative of whether to locally store the reference information obtained from the data server at the wireless terminal.

7. The method of claim 6, wherein monitoring at least one predetermined storage condition comprises determining whether the wireless terminal has sufficient storage capacity to locally store the reference information obtained from the data server.

8. The method of claim 6, wherein monitoring at least one predetermined storage condition comprises determining whether the request identifier is among a predetermined number of most frequently requested request identifiers.

9. The method of claim 6, wherein monitoring at least one predetermined storage condition comprises determining whether the request identifier is among a predetermined number of most recently requested request identifiers.

10. The method of claim 6, wherein monitoring at least one predetermined storage condition comprises determining whether the request identifier has been requested at least a predetermined number of times.

11. The method of claim 10, further comprising determining whether the request identifier has been requested the predetermined number of times within a predetermined period of time.

12. The method of claim 6, further comprising providing a selectable option to locally store the reference information obtained from the data server at the wireless terminal, and wherein monitoring at least one predetermined storage condition comprises determining whether the option to locally store the reference information has been selected.

13. The method of claim 1, further comprising:
determining whether a predetermined activity condition is fulfilled; and
initiating a default activity upon fulfillment of the predetermined activity condition.

14. The method of claim 13, wherein:
determining whether a predetermined activity condition is fulfilled comprises determining whether there is user input inactivity for a predetermined time period; and
initiating a default activity comprises initiating the search for the desired reference information upon expiration of the predetermined time period.

15. The method of claim 13, wherein:
determining whether a predetermined activity condition is fulfilled comprises determining whether there is user input inactivity for a predetermined time period; and initiating a default activity comprises presenting a notification to the wireless terminal user that retrieval of the desired reference information from the data server will incur a cost to the user, wherein presenting the notification occurs upon expiration of the predetermined time period if the desired reference information is not locally stored at the wireless terminal.

16. The method of claim 13, wherein:
determining whether a predetermined activity condition is fulfilled comprises monitoring for entry of an initiation command; and
initiating a default activity comprises initiating a function associated with a highlighted link on a graphical display of the wireless terminal, wherein the function associated with the highlighted link is executed upon entry of the initiation command.

17. The method of claim 1, wherein the data server is a dictionary server, and the desired reference information is at least one of dictionary definitions and language translations.

18. The method of claim 1, wherein the reference information is produced from a publicly available source.

19. A wireless device for initiating requests for reference information from a wireless network and obtaining requested reference information in response thereto, wherein the wireless network is configured to communicate with a second network having an information server via a gateway, the wireless device comprising:
an input user interface to receive the requests for reference information;
a memory to store reference information received at the wireless device;
an output user interface to present the reference information corresponding to the requests and to notify a user if the reference information is not locally stored;
a processor configured to determine whether the reference information corresponding to the request is locally stored in the memory, to present the reference information via the output interface if the reference information is locally stored in the memory, to establish a connection with the information server if the reference information is not stored in the memory and to transmit the requests for reference information to the information server in the second network to obtain the reference information from the information server if the reference information is not stored in the memory, and to present the reference information obtained from the information server via the output user interface.

20. The wireless device as in claim 19, wherein the wireless device is Wireless Application Protocol (WAP)-compliant, and wherein the requests transmitted to the second network are transmitted via the Wireless Application Protocol.

21. The wireless device as in claim 19, wherein the requests for reference information are transmitted from the wireless device as a Uniform Resource Locator (URL).

22. The wireless device as in claim 19, wherein the requests for reference information are transmitted from the wireless device as a Uniform Resource Locator (URL) having an associated index reference to identify the reference information from within the information identified by the URL.

23. The wireless device as in claim 19, wherein the processor is further configured to locally store the reference information obtained from the information server at the wireless terminal.

24. The wireless device as in claim 23, wherein the processor is further configured to monitor at least one predetermined storage condition indicative of whether to locally store the reference information obtained from the information server at the wireless terminal.

25. The wireless device as in claim 23, wherein the processor is further configured to monitor at least one predetermined activity condition, and to initiate a default activity upon fulfillment of the predetermined activity condition.

26. The wireless device of claim 19, wherein the reference information is produced from a publicly available source.

27. A communication system for communicating reference information, comprising:
a network of computing systems, wherein at least one of the computing systems comprises a server computing system;
a wireless network;
a gateway computing system configured to bridge communications between the network of computing systems and the wireless network;
at least one wireless device to communicate via wireless transmissions within the wireless network and to communicate with the server in the network of computing systems via the gateway in accordance with a predefined protocol, wherein the at least one wireless device comprises:
(a) an input user interface to receive the requests for reference information;
(b) a memory to store reference information received at the wireless device;
(c) an output user interface to notify a user if the reference information is not stored at the wireless device and to present the reference information corresponding to the requests;
(d) a processor configured to determine if the reference information corresponding to the request is locally stored in the memory, to present the reference information if the reference information is locally stored in the memory, to establish a connection with the server if the reference information is not stored in the memory, to transmit the requests for the reference information to the server to obtain the reference information from the server if the reference information is not stored in the memory, and to present the reference information obtained from the server via the output user interface if the reference information is obtained from the server.

28. The system as in claim 27, wherein the gateway computing system is a Wireless Application Protocol gateway and wherein communications between the wireless device and the server are conducted in accordance with the Wireless Application Protocol.

29. The system as in claim 27, wherein the wireless device is Wireless Application Protocol compliant, and wherein the communication between the wireless device and the server is effected via the Wireless Application Protocol.

30. The system as in claim 27, wherein the server computing system is a dictionary server computing system.

31. The system as in claim 27, further comprising an information filter coupled to the server to convert the information retrieved from the server from a first format into a second format.

32. The system as in claim 27, further comprising an information filter coupled to the server to convert the information retrieved from the server from Hypertext Markup Language (HTML) to textual HTML.

33. The system as in claim 27, wherein the wireless device is a wireless telephone.

34. The communication system of claim 27, wherein the reference information is produced from a publicly available source.

35. A computer-readable program storage medium tangibly embodying a program of instructions executable by a computing system having locally-stored data to process reference information requests by performing steps comprising:

receiving a request identifier entered by the user at the wireless terminal and searching the locally-stored data to identify desired reference information corresponding to the request;

determining whether the desired reference information is locally stored at the wireless terminal;

notifying the user if the desired reference information is not locally stored;

presenting the desired reference information to the user via the wireless terminal if the desired reference information locally stored at the wireless terminal;

establishing a connection with a data server operating within a second network via a gateway bridging the wireless network and the second network if the desired reference information is not locally stored at the wireless terminal;

transmitting the request identifier from the wireless terminal to the data server, if the desired reference information is not locally stored at the wireless terminal; and presenting the desired reference information obtained from the data server.

36. The computer-readable program storage medium as in claim 35, wherein the program of instructions further performs steps comprising receiving the desired reference information at the wireless terminal from the gateway.

37. The computer-readable program storage medium as in claim 35, wherein the program of instructions for transmitting the request identifier and for receiving the desired reference information comprises communicating the request identifier and the desired reference information via Wireless Application Protocol.

38. The storage medium of claim 35, wherein the reference information is produced from a publicly available source.

39. An apparatus for obtaining reference information via a wireless terminal operating within a wireless network, comprising:

means for presenting an input interface for a wireless terminal user to input a request for desired reference information;

means for searching local data storage of the wireless terminal for the desired reference information corresponding to the request;

means for notifying the wireless terminal user if the desired reference information is not locally stored;

means for presenting the desired reference information via an output interface if the desired reference information is stored in the local data storage;

means for establishing a connection with at least one reference server configured within a remote network exclusive of the wireless network if the desired reference information is not stored in the local data storage;

means for transmitting the request to the at least one reference server;

means for receiving the desired reference information at the wireless terminal from the reference server if the desired reference information was available on the reference server; and means for presenting the desired reference information to the user if the desired reference information was received from the reference server.

* * * * *